(No Model.)
D. McCURDY.
PROCESS OF PURIFYING WATER, AGING AND PURIFYING VINOUS AND SPIRITUOUS LIQUORS, AND PURIFYING THE UNFERMENTED JUICES OF FRUITS.
No. 285,825. Patented Oct. 2, 1883.
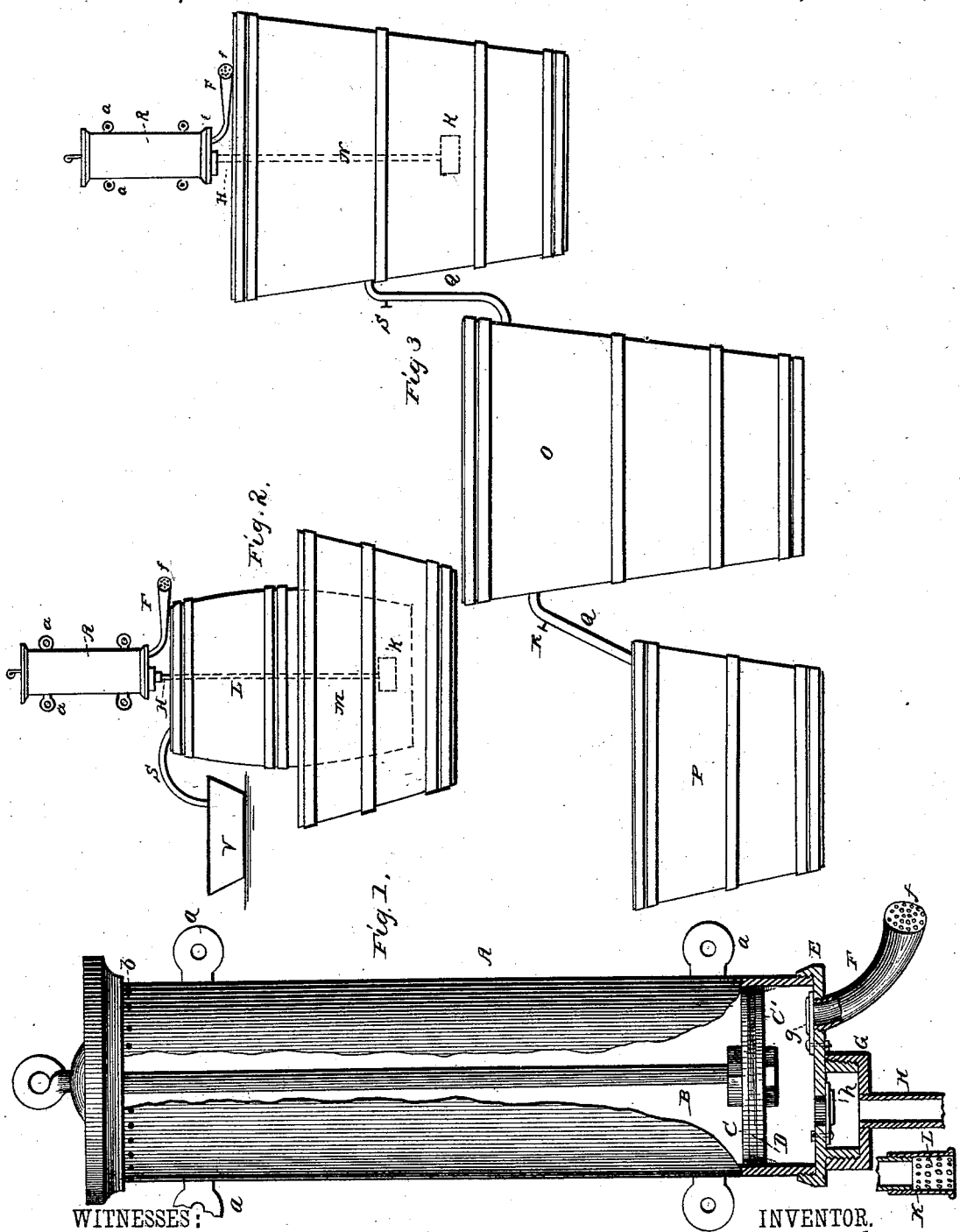

UNITED STATES PATENT OFFICE.

DAVID McCURDY, OF OTTAWA, OHIO.

PROCESS OF PURIFYING WATER, AGING AND PURIFYING VINOUS AND SPIRITUOUS LIQUORS, AND PURIFYING THE UNFERMENTED JUICES OF FRUITS.

SPECIFICATION forming part of Letters Patent No. 285,825, dated October 2, 1883.

Application filed October 7, 1882. (No model.)

*To all whom it may concern:*

Be it known that I, DAVID McCURDY, a citizen of the United States, residing at Ottawa, in the county of Putnam and State of Ohio, have invented certain new and useful improvements in the process of purifying water, in the aging and purifying of vinous and spirituous liquors, and the preserving and purifying of the unfermented juices of fruits; and I do hereby declare that the following is a full, clear, and exact description of my invention, which will enable others skilled in the art to which it appertains to make and use the same.

My invention relates to means for purifying water and spirituous and vinous liquors containing suspended organic matter or other impurities which render it unfit for culinary, drinking, or mechanical purposes.

The nature of the invention will be hereinafter more clearly set forth in the specification and pointed out in the accompanying drawings, in which—

Figure 1 is an elevation, partly in section, of a condensing air-pump by means of which pure air is forced into the liquid. Fig. 2 is a perspective view of the pump and reservoirs used in oxidizing wines, cider, &c.; and Fig. 3, a perspective view of a series of oxidizing and settling reservoirs.

It is well known that water in wells, cisterns, hydrants, and tanks used for drinking, culinary, and mechanical purposes contains a large amount of organic matter held in suspension or mechanical solution. The object of my invention is to break up the particles thus held and allow them to be precipitated and rendered inert, and at the same time to oxygenize the water or other liquid by forcing into it under pressure fresh air, which breaks up the bubbles containing the organic matter, thus causing the foul gases to come to the top and escape and the oxidized sedimentary matter to fall. This suspended organic matter and the foul gases cause the water in ships' tanks to become unfit for use, and the bilge-water of ships in hot climates can be thus purified, thereby preventing disease. Again, in the southern States and countries where tanks and cisterns are used for holding rain-water for domestic use the same thing obtains, and a ready and effective means for purifying such waters has not heretofore existed. By the means hereinafter explained such waters can be easily, effectually, and quickly rendered pure.

I employ in this connection a condensing air-pump, A, of suitable size for the purpose required, and actuated by any suitable motive power. This pump is located above the platform of a well, cistern, tank, or reservoir, with the pipe H extending down to near the bottom of the liquid, the lower end of the pipe being closed with a thimble, K, perforated with small holes for the passage of the air, which is forced out laterally through the openings in a compressed form, thereby agitating and aerating the entire mass of the liquid and expelling the foul gases through a suitable opening in the platform. The suspended or combined organic matter, being oxidized by the air and precipitated during the intervals of rest, will remain undisturbed in the quiet liquid below the thimble of the air-pipe. The bubbles or sacks which contain the foul gases are ruptured by the churning action of the air forced in from above, and these gases rise and escape, thus causing a complete circulation in the water and air above it, and preventing the growth of low orders of animal and plant life found in impure water. The fresh air is brought into the pump by the pipe F, the end of which is covered with a netting or screen, $f$, which prevents dust from being taken into the pump. The pump-entrance of this air-pipe is covered with a valve, $g$, which is closed on the down-stroke of the piston B, whose head is composed of two circular plates, C C', between which is placed the leather packing D. A valve, $h$, on the under side of plate E affords a passage for the air into pipe H. The air-condensing tube or pipe F may be carried to the top of a house, so as to obtain pure air. Air-holes $b\ b$ in the top of the cylinder permit the escape of air on the upstroke of the piston, thus avoiding atmospheric pressure.

The pump is attached to a suitable frame by the lugs $a$. When applied to the purification of liquors, the air may be forced in at a uniform temperature—say 100° Fahrenheit—and deprived of moisture. The cask or tank L is to be but partially filled. The warm dry air is forced into the liquor for a suitable time, so as to oxidize the organic matter and expel the peculiar taint produced in the course of the fermentation, through the escape-pipe S into the tank V, which is filled with water, without loss of anything but the impurities in a gaseous form, the remainder being oxidized, and the essential oils and flavor of the particular fruit, vegetable, or grain retained and caused to combine with the alcohol, thus giving the liquor age, smoothness, and increased value in a comparatively short time, and in an economic manner.

In the treatment of ciders and new wine I place the cask L in a vessel, M, containing ice, so as to keep the fluid at a temperature of 50° Fahrenheit, or lower than that at which the vinous fermentation can take place. After the oxidation has taken place, the top or upper portion of the liquid is drawn off by means of a siphon, S, into a settling reservoir or reservoirs, V. New liquid may again be introduced and the same operation continued. The aeration and oxidation are continued for a sufficient time to cause a separation of the oxidized organic and coloring matter, which will be precipitated, together with the peculiar principles which cause the vinous fermentation, and then draw off the supernatant liquor, which will contain all the flavoring elements of the particular fruit without the formation of alcohol; and the cause of the vinous fermentation having been removed the acetic fermentation cannot take place. This, with the chemical changes that have taken place, will make the liquor thus treated non-intoxicating, and one which will retain its flavor in any climate without containing alcohol.

When the process is used in factories, mills, &c., or connected with a water-supply on a large scale, I use a series of agitating and settling reservoirs, N O P. In the first or second one of the series I place the aerating-pump just described, and gradually draw off the top of the water until it finally reaches the last or delivery reservoir in a very pure state. The pumps may have one or more pipes extending beneath the liquid, with radiating arms and thimbles, so as to aerate and cause the water in tanks or reservoirs to be agitated and boil by the action of the compressed air in different directions, thus agitating and aerating the entire mass of water. I also place an air-pipe with thimble, screen, or netting over and around the end of the receiving-pipe of city water-works, so that on the downstroke of the air-pump the filth and sediment in lake or river are caused to rise and float away in the upper current, small fish and other living organisms being driven away, and thus much purer water is obtained in the beginning of the process for water-supply of cities.

I am aware of a process for purifing liquors in which air has been conducted or forced by an air-pump into a tank, where it is washed and warmed and then forced into the liquor. I am also aware that liquors have been refined by subjecting them in a spray to air-currents, and subsequently condensing said currents. I am further aware that liquors have been commingled with heated air in a closed vessel, the air serving to heat and oxygenize the liquors. Such process I do not claim; but

What I claim as new, and desire to secure by Letters Patent, is—

The process of purifying liquids which consists in forcing air therein under pressure, as described, whereby the impurities are oxidized, permitting the same to settle, and then passing the surface-liquid through a series of receptacles, as described, whereby the surface-liquid from each is transferred to the succeeding one, substantially in the manner and for the purpose set forth.

In testimony whereof I hereunto affix my signature in the presence of two witnesses.

DAVID McCURDY.

Attest:
DAVID I. BROWN,
W. L. LENTZY.